Jan. 10, 1967   C. E. ANDERSON   3,296,890
VALVE OPERATOR
Filed Sept. 24, 1964

INVENTOR.
CLIFFORD E. ANDERSON
BY
AGENT

United States Patent Office 3,296,890
Patented Jan. 10, 1967

1

3,296,890
VALVE OPERATOR
Clifford E. Anderson, Houston, Tex., assignor to ACF Industries, Incorporated, New York, N.Y., a corporation of New Jersey
Filed Sept. 24, 1964, Ser. No. 398,998
11 Claims. (Cl. 74—608)

This invention is directed generally to valve constructions and more specifically to valve operator structures provided with means adapting the valve and valve operator structures for disposition in hostile environments.

The petroleum industry, in its continuous search for new sources of petroleum supply, has recently discovered a number of extremely large oil reserves which are located beneath the ocean. Many oil wells have been drilled in the ocean floor to tap these oil reserves. While many of the oil wells in these undersea oil fields have been completed with the completion structures or wellhead assemblies of the wells positioned on platforms located above the surface of the ocean, a number of wells have been completed with the wellhead assemblies disposed on the ocean floor with pipelines to carry the petroleum from the wells extending along the ocean floor to a storage facility. Valves for controlling the flow of petroleum from these undersea wells and for controlling flow of oil in the flow lines have been developed by the valve industry to meet the demands of the petroleum industry.

For loading and unloading petroleum from tanker vessels, a number of undersea remotely controlled loading systems have been developed. These systems frequently employ very large pipelines, thereby requiring very large valves for the control thereof which must be adapted for undersea service and positioned with the pipeline on the ocean floor.

The development of special valves and valve operator systems for undersea service has been quite expensive. A prime consideration in the development of a valve for undersea service has been the provision of structure for operating the valve from a remote position. This generally involves the use of various types of power operators, such as hydraulic operators or electrically energized operator structures. Obviously, for virtually any power operator structure, a control system is required for selectively energizing the operator. The cost involved for the operator structure and the control structure therefor considerably increases the cost of the valve. To reduce the cost of undersea pipelines it is desired to eliminate power operators and operator control systems for valves which are seldom operated but are merely provided for shutting the line down for servicing or for emergencies. For the infrequent operation of the valve a diver could be sent down to the ocean floor to operate the valve. Manually operated valves might also be employed in areas where the valve might be subject to intermittent submersion, for example in shallow water subject to tidal fluctuation.

Accordingly, it is a primary object of this invention to provide structure for adapting a conventional valve for service in a hostile environment such as undersea service.

It is a further object of this invention to provide a novel operator structure for a valve which will allow the valve to be operated in a hostile environment without the possibility of the interior portion of the valve and operator becoming damaged due to contamination by the hostile environment.

An even further object of this invention contemplates the provision of a novel valve operator structure, including means for preventing unauthorized operation of the valve on which the operator is positioned.

Other and further objects of this invention will become obvious upon an understanding of the illustrative embodiment about to be described, or will be indicated in the appended claims; and various advantages not referred to herein will occur to one skilled in the art upon employment of the invention in practice.

Briefly, the invention comprises a manually operated valve operator structure adapted to be fixed to a valve in such a manner as to induce opening and closing of the valve. A rotatable drive stem extends from the operator and is adapted upon being rotated to induce rotary movement to a gear arrangement within the operator for imparting reciprocal movement to the gate member of the valve. The operator structure includes a protective mechanism which completely encloses the outer extremity of the operator drive stem when the valve is not being operated to protect the drive stem and the interior portion of the operator from contamination. A removable portion of the protective mechanism on the operator structure allows exposure of the outer extremity of the operator stem to the hostile environment without the possibility of contamination of the interior portion of the operator by the hostile environment. The removable portion of the protective structure is also adapted for reassembly to the protective mechanism within the hostile environment to again lend protection to the outer extremity of the operator stem and the interior portions of the operator.

A preferred embodiment of the invention has been chosen for purpose of illustration and description and is shown in the accompanying drawings, forming a part of the specification, wherein.

Figures 1, 2, 3, 4:
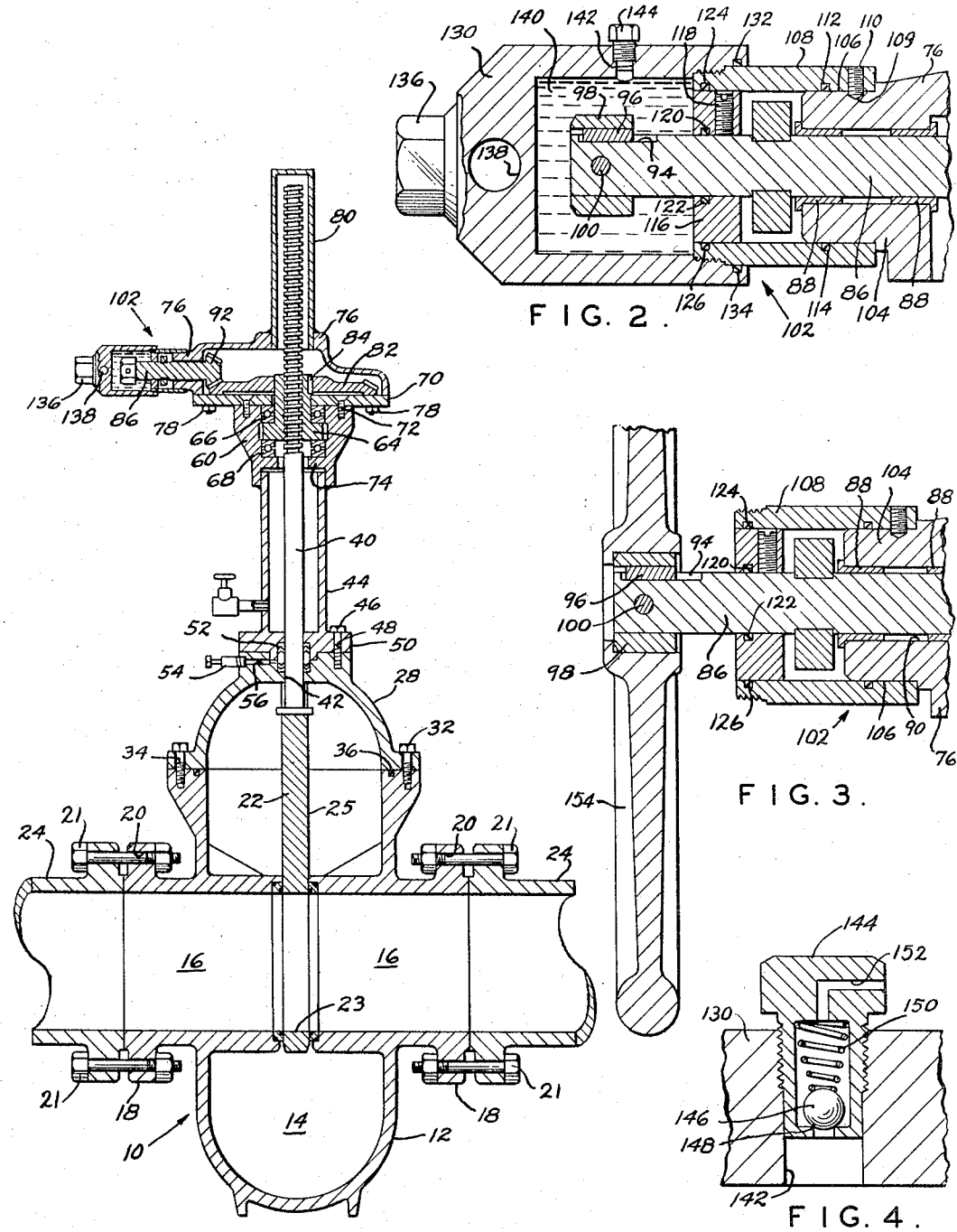
FIGURE 1 is an elevational view in section, illustrating a valve incorporating the invention.
FIGURE 2 is a partial elevational view in section, illustrating the invention in greater detail.
FIGURE 3 is a partial elevational view of the protective structure of FIGURE 2, having a portion thereof removed and a handwheel fixed to the operator stem.
FIGURE 4 is an elevational view in section, illustrating the pressure relieving structure of FIGURE 2 in greater detail.

Referring now to the drawing for a better understanding of the invention, a valve 10 is illustrated in FIGURE 1, which comprises a valve body 12 formed with a valve chamber 14 and having flow passages 16 in communication with the valve chamber 14. A pair of annular flanges 18, formed on the valve body 12 about the flow passages 16, are provided with a series of bolt openings 20, which receive bolts 21 for attachment of the valve 10 to the flange portions of a pipeline 24. The valve 10 might be connected to the pipeline 24 by any other well-known connection structure, such as threaded connection or welded connection for example, without departing from the spirit or the scope of this invention. A gate member 22 is positioned within the valve chamber 14 and includes a port 23, which is alignable with the flow passages 16 to allow the flow of fluid through the valve in the open position of the valve, and a solid portion 25 which is adapted in the closed position of the valve to block the flow passages 16. A pair of seat assemblies 26 are positioned one on either side of the gate 22 within annular seat recesses formed in the valve body 12 to establish a fluid-tight seal between the gate and valve body. A bonnet assembly 28 is removably fixed to an annular flange portion 30 of the valve body 12 by a series of bolts or threaded studs 32, which extend through a series of openings 34 formed in the bonnet flange 30 to form a closure for the valve chamber 14. An annular sealing member 36 is disposed between the bonnet and the valve body to establish a fluid-tight seal therebetween. A valve stem 40, having its lower end connected to the upper extremity of the gate 22, extends through an opening 42 formed in the bonnet 28. A yoke tube 44 is fixed to the upper extremity of the bonnet 28 by a series of bolts 46, which pass through a series of openings 48, formed in a flange 50 of the yoke tube 44. An annular packing chamber is formed by coextensive enlarged bores formed in the bonnet 28 and the yoke tube 44 concentrically with the stem opening 42 and retains an annular packing assembly therein for the establishment of a fluid-tight seal between the valve stem 40 and the bonnet 28. A packing pressurizing fitting 54 is connected to the bonnet 28 and is communicated through a bore 56 to the packing chamber 52. Packing material, which may be a viscous substance, such as grease or plastic, is forced under pressure by the packing fitting 54 into the stem packing chamber 52, causing the packing assembly to be pressurized into tight sealing engagement with the stem 40 and with the packing chamber walls.

At the outer extremity of the yoke tube 44 is fixed a thrust bearing support structure 60, through which the valve stem 40 extends. A stem drive nut 62, having internal threads which mate with the external threads of the valve stem 40, has an annular flange portion 64 thereof retained within the thrust bearing assembly by upper and lower thrust bearings 66 and 68 respectively. A base plate 70, having an opening therein through which a portion of the drive nut extends, is fixed to the thrust bearing assembly 60 by a series of bolts 72 and serves to retain the upper thrust bearing 66 against outward movement. Inward movement of the lower thrust bearing 68 is effectively prevented by an annular flange 74, formed internally of the thrust bearing support structure 60. An operator housing 76 is fixed to the base plate 70 by a series of bolts 78 and includes an outer cover 80 fixed in sealed relation thereto which closes the outer extremity of the valve stem 40.

A bevel gear 82 is disposed within the housing 76, immediately adjacent the base plate 70 and is fixed to the drive nut 62 by a key 84 which cooperates with mating keyway slots formed in the bevel gear 82 and in the drive nut 62. An operator drive shaft 86 is journaled in sleeve bearings 88 (FIGS. 2 and 3), within a bore 90 in the housing 76 and carries at the inner extremity thereof a pinion gear portion 92 which mates with the bevel gear 82 and is operative to impart rotational movement to the bevel gear 82. The outer extremity of the shaft 86 is formed with a keyway 94, which is adapted to receive the key 96 of a stem drive adapter 98, to prevent rotational movement between the shaft 86 and the stem drive adapter 98. Aligned bores in the shaft 86 and stem drive adapter 98 receive a shear pin 100 which positively prevents rotation between the shaft and stem drive adapter.

In accordance with a feature of this invention, as illustrated in detail in FIGURES 2 and 3, a protective mechanism 102 is fixed to the housing 76 and encloses the outer extremity of the operator shaft 86 to protect the operator shaft, the operator and the valve structure from contact by a hostile environment or medium surrounding the valve. For example, the valve and operator structure might be submerged in seawater or in corrosive vapor, as well as in many other hostile liquid or gaseous environments. The protective structure of this invention effectively prevents any possibility of seepage of seawater or any other medium along the operator shaft into the housing 76, as well as protecting the outer extremity of the shaft 86 from damage by corrosion.

As illustrated in detail in FIGURES 2 and 3, the housing 76 is formed with a boss 104, having a portion thereof defining a cylindrical surface 106. A cylindrical tubular member 108, having a close fit with the surface 106, is removably fixed to the surface 106 by at least one set screw 110, the inner end of which is received within a depression 109 formed in the surface 106. The inner periphery of the tubular member 108 is formed with an annular groove 112, which receives an O-ring type elastomer sealing member 114, for the establishment of a fluid-tight seal between the tubular member and the housing 76. The depth of the groove 112 is substantially less than the cross-sectional dimension of the O-ring 114, causing the O-ring to be maintained under compression with the cylindrical surface 106 to establish a fluid-tight seal.

An annular collar 116 is fixed to the rotatable operator drive shaft 86, intermediate the ends thereof, by a set screw 118. An annular groove 120 is formed in the internal periphery of the collar 116 and retains an annular O-ring type elastomer sealing member 122, to establish a fluid-tight seal between the collar 116 and the stem 86. The O-ring sealing member 122, like the O-ring sealing member 114, is larger in cross-sectional diameter than the depth of the groove 120, thereby causing the sealing ring 122 to be maintained under compression between the shaft 86 and the groove 120. The annular collar 116 is disposed with its outer end substantially coplanar with the outer end of the tubular member 108, and with its exterior periphery in juxtaposed relation with the internal periphery of the tubular member 108. An annular groove 124 of substantially rectangular cross section is formed in the internal peripheral surface of the tubular member 108, adjacent the outer end thereof, and retains an O-ring type elastomer sealing member 126 therein to establish a fluid-tight seal between the exterior peripheral surface of the collar 116 and the interior peripheral surface of the tubular member 108. The cross-sectional dimension of the O-ring 126 is greater than the depth of the groove 124, thereby causing the O-ring 126 to be maintained under compression within the groove 124 to establish a fluid-tight seal with the exterior peripheral surface of the collar 116. While the sealing rings 114 and 122 are employed to provide a static seal, it is obvious that the O-ring 126 will be subject to the rotational movement of the collar 116 within the tubular member 108. The O-ring 126 will, therefore, be required to provide a dynamic seal between the tubular member 108 and the exterior peripheral surface of the collar 116.

As illustrated in detail in FIGURE 2, a protective covering structure 130 is formed with internal threads at one end thereof which mate with external threads formed on the tubular member 108, for attachment of the covering member 130 to the tubular member 108. To provide a positive fluid-tight seal between the protective cover member and the tubular member, an annular O-ring type elastomer sealing member 132 is positioned within an internal generally rectangular groove 134, formed in an enlarged diameter portion of the protective cover member 130. The O-ring sealing member 132 is compressed between the exterior peripheral surface of the tubular member 108 and the groove 134 to establish a fluid-tight seal between the cover member and the tubular member. The protective covering member 130 is provided with a bolt type head 136, so that the cover member may be removed from the tubular member by a diver using a wrench or the like. The cover member 130 may also be provided with a bore 138 at the outer extremity thereof so that a bar may be inserted through the bore 138, giving the diver or operator sufficient leverage to unthread the cover 130 from the tubular member 108. When the valve and operator structure is employed in hostile environments, such as seawater, for example, an interior chamber portion 140 of the protective cover member 130 surrounding the outer extremity of the shaft 86, will be filled with a heavy preservative liquid, such as grease, plastic material, or the like.

When assembling the cover 130 to the tubular member 108, the chamber 140 is first filled with the viscous preservative substance and then is threaded onto the tubular member. Obviously displacement of a portion of the viscous substance by the shaft 86 would cause the internal pressure within the chamber 140 to increase during the installation of the cover.

For the relief of excessive pressure within the interior of the cover member 130, an internally threaded bore 142 in the cover 130 for receiving a pressure relief fitting 144 is provided. As illustrated in detail in FIGURE 4, the pressure relief fitting 144 may be provided with a check valve structure such as the ball 146, illustrated in FIGURE 4. The ball check 146 is urged against a valve seat 148 by a compression spring 150 to establish a fluid-tight seal to prevent the seawater or other corrosive medium from entering tthe interior of the cover member 130. Excessive pressure within the cover member 130, which will be developed when the cover member is threadedly attached to the tubular member 108, will be vented to the medium surrounding the valve through an outlet bore 152 formed in the relief fitting 144. During the initial assembly of the cover member 130 to the tubular member 108, which assembly will generally take place prior to installation of the valve in the hostile environment, an amount of grease or plastic preservative material will be forced through the relief fitting 144 to relieve the excessive pressure within the chamber 140. An amount of the preservative material will remain within the fitting 144 thereby serving to prevent contact between the seawater and the check valve structure and maintaining the relief fitting against internal corrosion.

During assembly of the protective construction 102 to the operator housing 76 with the adapter 98 removed from the stem shaft 86, the collar 116 with its O-ring 122 placed within the groove 120 thereof, is positioned about the shaft 86. The set screw 118 is then tightened to secure the collar 116 to the shaft 86 against rotational movement therebetween. The tubular member 108 is then inserted over the collar 116 with its O-rings 114 and 126 in position within the grooves 112 and 124 respectively. With the tubular member 108 positioned as illustrated in FIGURES 2 and 3, the set screw 110 is threaded into the recess 109, thereby positively securing the tubular member on the cylindrical portion 106. The O-rings 114 and 126 in this position will be in positive sealing engagement respectively with the cylindrical surface 106 and the exterior peripheral surface of the collar 116. The stem drive adapter 98 is then replaced on the shaft 86 by inserting the key 96 in the keyway 94 and inserting the shear pin 100 into the aligned bores in the adapter and shaft. The cover member 130 is then filled with preservative material and threadedly assembled to the cylindrical member 108 in the manner discussed hereinabove.

Assuming that the valve and operator assembly is submerged in seawater along with the pipeline 24 and it is desired to operate the valve 10, a diver would descend to the valve depth and, using a wrench or leverage bar, would unthread the cover 130 from the cylindrical member 108. The diver would then position a handwheel 154 or other operating device mating with the adapter 98 at the extremity of the shaft 86. By turning the handwheel 154 in a well-known manner, the bevel gear operator would impart movement to the valve stem 40 causing the gate 22 to open or close as desired.

With the cover removed the outer extremity of the shaft, the outer portions of the cylindrical tubular member 108, and the collar 116 are exposed to the seawater. A portion of the preservative material will remain coated to the exposed surfaces, however, preventing direct contact of the metal portions with the seawater. The O-ring sealing members 122 and 126 will prevent any seawater from entering the operator housing 76 and thereby preventing contamination of the operator structure by the seawater. Too, an amount of preservative material would fill the clearance between the shaft 86 and collar 116 and between the collar 116 and tubular member 108, thereby preventing the possibility of seawater reaching the O-ring sealing members.

After the valve has been operated, the chamber 140 of the cover member 130 is again filled with preservative material and assembled to the tubular member 108 as indicated above, thereby displacing substantially all with the seawater preservative material. Any seawater which would become trapped within the chamber 140 during the undersea installation process would remain trapped within the preservative material.

The protective structure of this invention is inexpensive in manufacture and easily and quickly replaced in the event replacement is desired.

Since no operator control structure is exposed when the protective mechanism is in place, the operator cannot be inadvertently operated or operated by an individual without the aid of a wrench or bar and handwheel structure.

While this application has been generally directed to a stem protecting mechanism for a manually operated valve operator structure, it is obvious that the invention can be employed in the protection of any construction including a rotatable stem or shaft extending from a housing. For example, a valve without an operator structure could successfully employ the protective structure of this invention.

From the foregoing, it is evident that I have produced a novel construction of adapting existing manually controlled valve structures for disposition within a corrosive medium or other hostile environment. It is also apparent that I have produced an inexpensive mechanism for adapting a valve and operator structure for use in a hostile environment, which is reliable in use and which is easily and quickly replaced if desired. The invention also provides protection against inadvertent or unauthorized valve operation and is effective to allow desired manual operation of the valve underwater without involving the possibility of contaminating the valve or operator structures by the seawater. The invention, therefore, is one well adapted to attain all of the objects hereinabove set forth together with other advantages which are obvious and inherent from a description of the apparatus itself.

It will be understood that certain features and subcombinations are of utility and may be employed without reference to other features and subcombinations. This is contemplated by and is within the scope of the appended claims.

As many possible embodiments may be made of the invention without departing from the scope thereof, it is to be understood that all matter herein set forth or shown in the accompanying drawing is to be interpreted as illustrative and not in a limiting sense.

I claim:

1. A protective mechanism comprising a housing, a shaft extending from within the housing in movable relation therewith, a tubular member disposed about a portion of the shaft and being fixed in sealing relation to the housing, a collar fixed in sealing relation to the shaft and being disposed within one extremity of the tubular member in sealing relation thereto, said collar being movable with said shaft relative to said tubular member, means on said tubular member sealingly enclosing the outer extremity of said shaft.

2. A protective mechanism as recited in claim 1, including a protective fluid disposed within said enclosing means.

3. A protective mechanism as recited in claim 2 including means for relieving excessive pressure within said enclosing means.

4. A valve operator for a valve comprising an operator housing, a rotatable drive shaft extending from the housing and adapted to induce opening and closing of the valve, a tubular member, removably connected to the housing in sealing relation thereto and disposed about a portion of the shaft, means immovably connected to said shaft and disposed within said tubular member for establishing a fluid-tight seal between said tubular member and said shaft, means defining a removable sealed enclosure disposed about the outer extremity of said shaft.

5. A valve operator, as set forth in claim 4, including a protective fluid disposed within said enclosure means.

6. A valve operator, as set forth in claim 5, including means for venting excessive pressure from within said enclosure to the medium surrounding said operator.

7. A protective mechanism comprising a housing, a rotatable drive shaft extending from said housing, a tubular member being fixed to the housing, an annular groove defined in the interior periphery of said tubular member, an annular sealing member within said groove and being in sealing engagement with said housing, a collar fixed to the shaft and being positioned within the outer extremity of the tubular member, an annular groove formed in the collar, an annular sealing member in said collar groove and establishing a seal between said collar and said shaft, a second groove formed in said tubular member, an annular sealing member disposed within said second groove and establishing a fluid-tight seal between said tubular member and said collar, means preventing contact between the medium surrounding said protective mechanism and said shaft and collar.

8. A protective mechanism comprising a housing, a rotatable drive shaft extending from said housing, a tubular member being fixed to the housing, a first annular groove defined in the interior periphery of said tubular member, an annular sealing member within said groove and establishing a fluid-tight seal between said tubular member and said housing, a collar fixed to the shaft and being positioned within the outer extremity of the tubular member, an annular groove formed in the exterior peripheral surface of said collar, an annular sealing member in said collar groove and establishing a seal between said collar and said shaft, a second groove formed in said tubular member, an annular sealing member disposed within said second groove and establishing a fluid-tight seal between said tubular member and said collar, means defining an enclosure being removably fixed to said tubular member, means establishing a fluid-tight seal between said tubular member and said enclosure means.

9. A protective mechanism comprising a housing, a rotatable drive shaft extending from said housing, a tubular member being fixed to the housing, a first annular groove defined in the interior periphery of said tubular member adjacent one end thereof, an annular sealing member within said groove and establishing a fluid-tight seal between said tubular member and said housing, a collar fixed to the shaft and being positioned within the outer extremity of the tubular member, an annular groove formed in the collar, an annular sealing member in said collar groove and establishing a seal between the collar and said shaft, a second groove formed in said tubular member adjacent the other end thereof, an annular sealing member disposed within said second groove and establishing a fluid-tight seal between said tubular member and said collar, means defining an enclosure being removably fixed to said tubular member, means establishing a fluid-tight seal between said tubular member and said enclosure means, a protective fluid disposed within said enclosure means.

10. A protective mechanism comprising a housing, a rotatable drive shaft extending from said housing, a tubular member being fixed to the housing, a first annular groove defined in the interior periphery of said tubular member at one end thereof, an annular sealing member within said groove and establishing a fluid-tight seal between said tubular member and said housing, a collar fixed to the shaft and being positioned within the outer extremity of the tubular member, an annular groove formed in the collar, an annular sealing member in said collar groove and establishing a seal between the collar and said shaft, a second groove formed in said tubular member adjacent the other end thereof, an annular sealing member disposed within said second groove and establishing a fluid-tight seal between said tubular member and said collar, means defining an enclosure being removably fixed to said tubular member, means establishing a fluid-tight seal between said tubular member and said enclosure means, a protective fluid disposed within said enclosure means, said enclosure means including means for venting excessive pressure from within said enclosure means to the medium surrounding the protective mechanism.

11. A protective mechanism comprising a housing, a rotatable drive shaft extending from said housing, a tubular member being fixed to the housing, a first annular groove defined in the interior periphery of said tubular member at one end thereof, an annular sealing member within said groove and establishing a fluid-tight seal between said tubular member and said housing, a collar fixed to the shaft and being positioned within the outer extremity of the tubular member, an annular groove formed in the collar, an annular sealing member in said collar groove and establishing a seal between the collar and said shaft, a second groove formed in said tubular member adjacent the other end thereof, an annular sealing member disposed within said second groove and establishing a fluid-tight seal between said tubular member and said collar, an enclosure being threadedly attached to the exterior periphery of said tubular member and enclosing the outer extremity of said shaft, a groove formed in said enclosure, a sealing member disposed within said enclosure groove and establishing a fluid-tight seal between the tubular member and the enclosure, a protective fluid disposed within said enclosure, said enclosure having a check valve therein for venting excessive pressure from within said enclosure to the medium surrounding the protective mechanism.

References Cited by the Examiner
UNITED STATES PATENTS

| | | | |
|---|---|---|---|
| 845,373 | 2/1907 | Payne | 74—18.1 |
| 2,964,961 | 12/1960 | Gulick | 74—608 |

FRED C. MATTERN, Jr., *Primary Examiner.*

W. S. RATLIFF, Jr., *Assistant Examiner.*